United States Patent Office 3,424,547
Patented Jan. 28, 1969

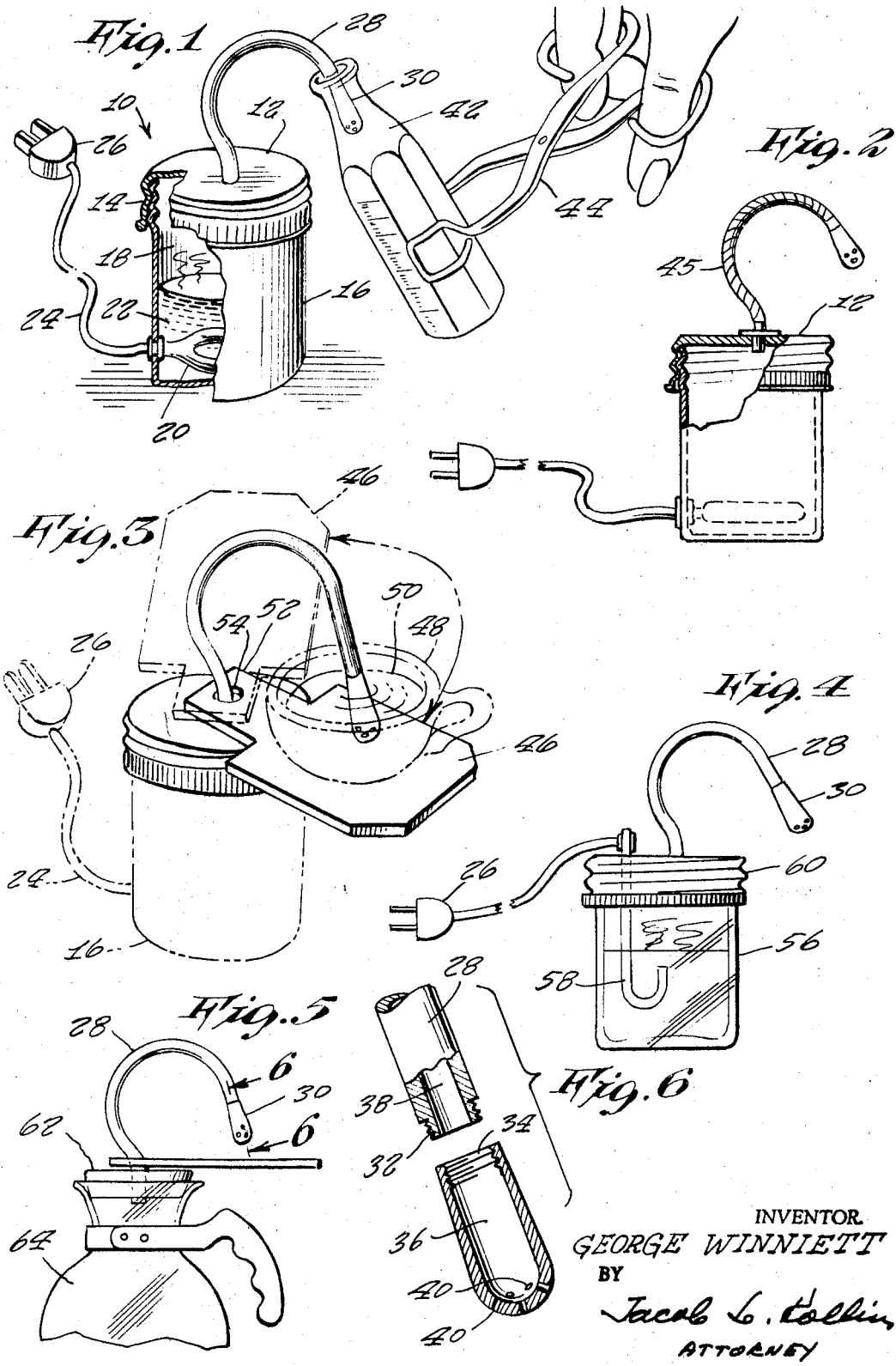

3,424,547
STEAM STERILIZING AND HEATING DEVICE
George Winniett, % Colwell, R.D. 1,
Bloomingburg, N.Y. 12721
Filed Nov. 13, 1964, Ser. No. 411,048
U.S. Cl. 21—92    1 Claim
Int. Cl. A61l 3/00, 3/02

ABSTRACT OF THE DISCLOSURE

A steam sterilizing device comprising a container, a container cap, a U-shaped tube extending through the container cap, the exterior end of the tube having a nozzle with openings therein and a heating element in the container and a platform supported on the cap.

---

This invention relates generally to steam transfer devices. More specifically it relates to steam sterilizers and steam developing apparatus.

A principal object of the present invention is to provide a sterilizer for infant bottles wherein live steam is delivered from a source to the interior of an infant bottle and wherein it is not necessary to place the entire bottle into a sterilizer for sterilization purposes.

Another object is to provide a sterilizer for infant bottles which need generate a relatively small amount of steam for sterilization thereof and which accordingly is of a relatively small size and thus is conveniently portable and quick to accomplish its intended service.

Another object is to provide a sterilizer and steam generating apparatus which may be electrically powered by means of a convenient electric cord and plug adaptable for attachment to ordinary house current outlets.

Still another object is to provide a steam heating and transfer device whereby steam can be quickly generated and delivered into a vessel containing water for the purpose of raising the temperature of the water thereof, such as making a quick cup of hot coffee, tea or the like.

Yet a further object is to provide a steam transfer device which may be readily disassembled so as to provide access to cleaning the interior thereof.

Other objects are to provide a sterilizer or heat transfer device which is simple in design, inexpensive to manufacture, rugged in construction, easy to use and efficient in operation.

These and other objects will be readily apparent upon a study of the following specifications and the accompanying drawing wherein:

FIGURE 1 is a perspective view of the present invention shown partly in cross-section and being indicated in operative use;

FIGURE 2 is a side elevation view thereof partly in cross-section.

FIGURE 3 is a perspective view thereof shown in a modified operative use;

FIGURE 4 is a side elevation view of a modified form of the invention;

FIGURE 5 is a fragmentary side elevation showing the invention applied to a Silex type coffee maker; and FIGURE 6 is an enlarged cross-sectional view 6—6 of FIGURE 5.

Referring now to the drawing in detail the numeral 10 represents a sterilizer according to the present invention wherein there is a container cap 12 having a screw thread 14 for attachment to a metal container 16 having a chamber 18. An electric heating element 20 is fixedly secured to a side wall of the container and extends into the chamber for heating water 22 placed therein. An electric cord 24 and plug 26 provide means for connecting the heating element to an ordinary house current outlet receptacle.

A metal tube 28 of generally V-shaped configuration is mounted upon the upper side of the container cap, extending upwardly therefrom and being in communication with the chamber in the container by means of an opening at the end of the tube. At the opposite end of the tube a nozzle 30 is removably attached by means of screw thread elements 32 and 34. The nozzle has a hollow chamber 36 therein communicating with the interior opening 38 in the tube and a plurality of outlet openings 40 at the terminal end of the nozzle are provided. The tube 28 may be mounted off center on the container cap.

In operative use, water is placed into the metal container, the cap screwed on and the electric plug connected to an electric source. After steam is generated, a baby bottle 42 may be held by tongs 44 and placed over the nozzle whereby steam will pass from the container through tube 28 and nozzle 30 into the bottle, thereby sterilizing the same. A timing device may be used for turning off the heating element 20 when a desired temperature is reached.

In a modified construction shown in FIGURE 2, a flexible gooseneck 45 can accordingly be adjusted to accommodate any size or shape of bottle or other vessel into which it is received.

In FIGURE 3 another modified construction is shown wherein the structure described in FIGURE 1 additionally includes a platform 46 upon which a cup 48 may be conveniently supported while live steam is discharged into water 50 within the cup, thereby heating the water. Thus a cup of tea, cholocate or coffee can be quickly prepared. The platform includes a tab 52 having an opening 54 for the purpose of fitting over the tube. Due to the tube extending diagonally respective to a horizontal position of the upper surface of the cup, at a point relatively near the base of the tube, the platform resting upon the upper surface will remain secure from tilting and will readily support the weight of a cup of water. The opening 54 may be oversized respective to the tube diameter, as shown.

In FIGURE 4 another modified construction is shown wherein the container is a glass jar 56 and wherein the electrical heating element 58 is supported in depending angle from the jar cap 60.

In FIGURE 5, a form of the invention is shown wherein the cap 62 is receivable within a mouth of a conventional "Silex" coffee maker 64 thereby using the steam generated in the coffee maker for delivery out of the nozzle 30.

Thus there has been shown a convenient, quick and readily portable device for sterilizing baby bottles and the like and for heating water by discharging steam thereinto.

While various changes may be made in the detail construction, it is understood that such changes will be confined to the scope of the present invention as is defined in the appended claim.

Having thus set forth my invention, what I claim as new and desire to secure by Letters Patent of the United States is:

1. In a steam sterilizing and heating device, the combination of a container cap, means for securing of said container cap to a container, said container cap having an upwardly extending U-shaped tube mounted on said container cap, said tube having a central opening extending therethrough, one end of said tube extending through said cap and the other end of said tube extending angularly downward for being received within another vessel, said tube having a nozzle at said other end, said tube end having a thread, said nozzle having a corresponding thread for removable engagement of said nozzle with said other end of said tube, and said nozzle having a plurality of outlet openings for discharge of steam therethrough, said tube extending radially and upwardly respective to the upper side of said cap, in the vicinity adjacent said end of said tube, a platform, said platform having a tab, said tab having an enlarged opening for receiving said tube therethrough, whereby said platform may be horizontally supported at one end on said upper side of said cap.

References Cited

UNITED STATES PATENTS

| | | | |
|---|---|---|---|
| 1,492,083 | 4/1924 | Pegues | 233—51 |
| 1,743,823 | 1/1930 | Lawner | 219—275 |
| 2,676,239 | 4/1954 | Sanzone et al. | 126—271.1 |
| 2,897,554 | 8/1959 | Myrick | 21—119 |

FOREIGN PATENTS 33,296    7/1934    Netherlands.

F. T. RUDIAK, *Primary Examiner.*

U.S. Cl. X.R.

21—94, 102, 105, 117; 99—236, 251; 126—271.1; 128—173.2, 192; 219—271; 239—136; 248—102, 311